Feb. 5, 1924.

H. P. MACDONALD 1,482,570

FLEXIBLE DISK

Filed July 15, 1920

2 Sheets-Sheet 1

WITNESS.
Gustav Genzlinger.

INVENTOR.
Harry P. Macdonald
BY
ATTORNEYS.

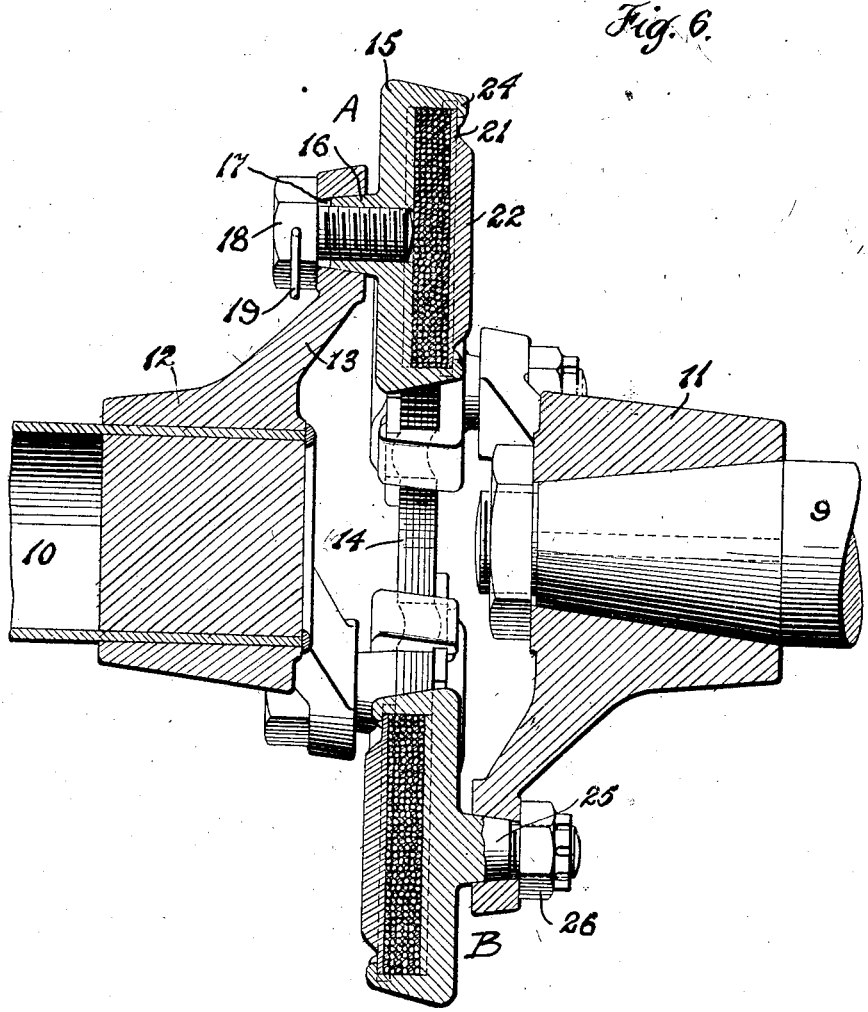

Patented Feb. 5, 1924.

1,482,570

UNITED STATES PATENT OFFICE.

HARRY P. MACDONALD, OF MONTCLAIR, NEW JERSEY, ASSIGNOR TO SNEAD & COMPANY, A CORPORATION OF NEW JERSEY.

FLEXIBLE DISK.

Application filed July 15, 1920. Serial No. 396,374.

*To all whom it may concern:*

Be it known that I, HARRY P. MACDONALD, a citizen of the United States, residing at Montclair, county of Essex, and State of New Jersey, have invented certain new and useful Improvements in Flexible Disks, of which the following is a specification.

This invention relates to flexible disks such as are used in torque transmitting assemblies of which the drive of an automobile is an example.

These flexible joints ordinarily consist of a pair of spider members, one of which is mounted on an end of each of the two shafts to be joined, the spiders being usually provided with three feet. A flexible disk or disks is or are interposed between the spiders, such disk being secured to the feet of the respective spiders by means of bolts passing through the disk and spider feet. The disks are flat and are usually constructed of rubberized layers of fabric vulcanized together, and one of the chief difficulties encountered has been that the washers placed under the bolt heads and intermediate the disk do not have a firm grip on the disk and shift with relation thereto under torque transmitting stresses, with the result that the bolt holes in the disk become enlarged and failure occurs. To overcome this difficulty, washers have been fluted or otherwise roughened and the bolts have been drawn up tightly so as to secure a firm grip of the washers on the disk as a result of the pressure. This, however, has also caused early failure of the disk because the pressure exerted not only places the fabric beneath the washers under great tension where the deformation of the gripping elements is appreciable, but also because there is a tendency to squeeze or force out the rubber from beneath the washers.

One of the primary objects of my invention is to provide a disk in which the foregoing difficulties are overcome and in which the pressure may be reduced to a more or less negligible, or at least not serious, factor in the life of the disk.

In general, my invention contemplates the provision of an improved disk of simple character, which will be easy to manufacture and will have extended life.

Figure 1:
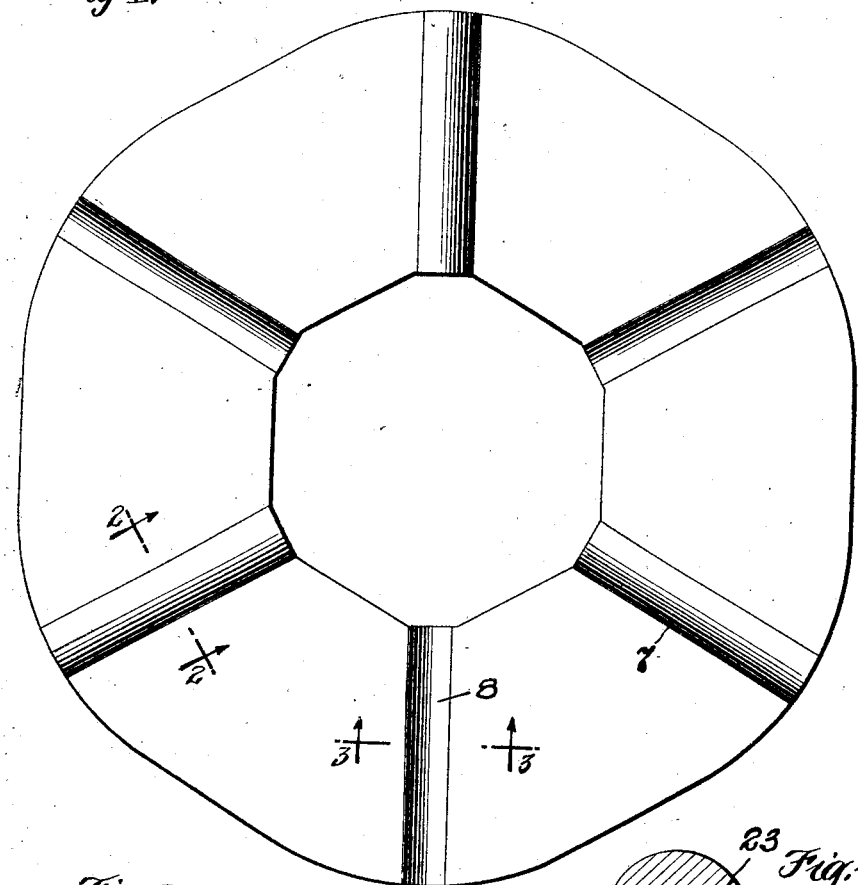
Figure 2:
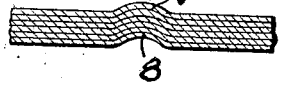
Figure 3:
Figure 3:
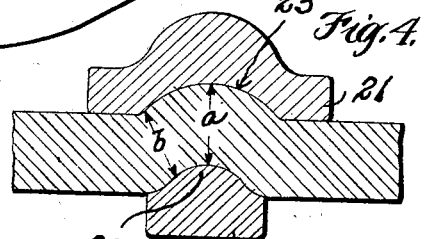
Figure 3:
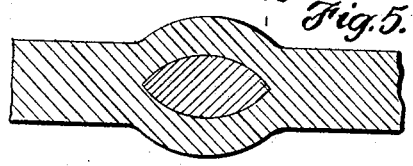

The foregoing, together with such other objects as may hereinafter appear, I obtain by means of a construction which I have illustrated in preferred form in the accompanying drawings, wherein:

Fig. 1 is a side elevation of a disk embodying my improvements; Fig. 2 is a section taken on the line 2—2 of Fig. 1; Fig. 3 is a section taken on the line 3—3 of Fig. 1; Fig. 4 is an enlarged fragmentary section illustrating the cooperation between the disk and its holding element; Fig. 5 is an enlarged fragmentary section illustrating a modification of my invention; and Fig. 6 is a section through a joint with the disk in place.

Referring now to Figs. 1 to 3, inclusive, it will be seen that the disk consists of an annular-like member, preferably composed of cord, rubberized and vulcanized, as will further appear, in the manner described in my co-pending application Serial No. 396,373, filed July 15, 1920, although my invention is equally applicable to disks built up of rubberized layers of fabrics, the general construction of which is well understood in this art. In accordance with my invention such a cord or fabric disk, after it has been built up, is vulcanized in a mold which is constructed so as to produce projecting portions, such as ribs 7, or depressed portions or grooves such as indicated at 8. I prefer, however, to so design the mold as to deflect the material at one point and thereby provide a projection on one face with a corresponding depression on the opposite face, the number of such projections and depressions depending upon the number of spider feet. Since the material is in a more or less plastic condition before vulcanization, it will be seen that the disk can be freely shaped in the mold and the cord or fabric displaced without placing the fabric under material tension so that practically the full strength of the disk is retained at the raised and depressed portion thereof. It will be seen that the raised and depressed portion may be made of any shape corresponding to the particular type of washer or gripping means employed. I prefer to have such portion extend radially across the entire width of the disk, to permit of the use of a connecting means such as that as will now be described.

Referring now to Fig. 6, the driving and driven shafts, 9 and 10, are respectively provided with spiders 11 and 12, each of which preferably has three feet 13. The disk is indicated at 14 and it is connected to the feet of the spider 12 by three connecting elements A and connected to the spider 11 by three connecting elements B, of the same general characteristics but differing in certain specific respects as will be pointed out.

The clamping elements A consist of a yoke-like member 15 which has a hub portion 16 tapered on the exterior to fit within the holes 17 on the feet of the spider 12, the interior of the hub being threaded to receive the attaching stud 18, which is locked in any desired manner as by means of the wire 19. The base of the yoke is beaded or rounded throughout its length as indicated at 20 in Fig. 4, the curvature thereof corresponding to the curvature of the depressed disk portion 8. The disk is held in the clamp by means of a keeper 21, the ends of which are notched to fit the arms of the yoke and which is strengthened or reinforced by a rib 22. The underface of the keeper is grooved as at 23, the curvature of such groove corresponding to the curvature of the projection or rib 7 of the disk, as illustrated in Fig. 4. The parts are secured together by applying pressure to the keeper 21 and bending over the yoke arm, as indicated at 24, in Fig. 6, while the parts are still under pressure. The bent over portion of the yoke arm may be welded to the keeper if desired. The clamping member B is of the same general construction differing only in that it is provided with a tapered lug 25 fitting the spider foot hole and threaded for the reception of the nut 26. I make no claim herein to the specific form of joint and clamping means, the same being made the subject matter of my copending application, Serial No. 396,375, filed July 15, 1920. It will be noted that the ribs or beads 7 and the depressions 8 alternately come on opposite faces of the disk so as to secure a balanced arrangement.

It will be observed that the radii of the curved portion of the disk and gripping elements and their centers are such that the distance a representing the thickness in the midst of an offset portion (Fig. 4) is greater than the distance b representing the thickness at the edges of the offset, which tends to prevent any shifting of the gripping elements circumferentially with respect to the disk.

From the foregoing, it will be seen that my improvements are advantageous in that a firm grip of the connecting or clamping elements on the disk is secured with much less pressure than would be required where the disk is flat and is forced to conform to the shape of the gripping element by pressure. The benefits flowing therefrom are that the cord or fabric is not placed under as great a tension and there is less tendency to crowd out the rubber from beneath the gripping elements, so that the full strength of the material is retained while at the same time a firm grip for torque transmitting purposes is secured.

In the modification shown in Fig. 5, I form the offset portion by inserting plugs in the disk during the process of construction, the preferred form of plug being shown in the figure. As here shown, the plug members embedded in the thickness of the disk serve to maintain opposed projections on the two faces of the disk, and the offset portion of the disk comprising these projections is thicker than the body of the disk.

I claim:

1. A flexible torque transmitting universal joint disk constructed with a laterally raised surface deformation forming a clamping seat for receiving the lateral pressure of a gripping device.

2. A flexible torque transmitting universal joint disk preformed with a laterally raised clamping seat, for receiving the lateral pressure of a gripping device with corresponding lateral conformation, said seat being of such configuration that it will have to be distorted from its original shape before slippage through the gripping device can occur.

3. As an article of manufacture, a flexible torque transmitting universal joint disk formed with a clamping portion of configuration to be compressed, with displacement of elements thereof toward one another in the general plane of the disk side, by the lateral gripping pressure of correlatively shaped clamping means on such portion.

4. A flexible torque transmitting universal joint disk molded with convex lateral clamp seats for receiving the lateral grip of concave clamps, so as to resist slippage relative to such concave clamps by virtue of the preformed correlative configuration of the parts.

5. A flexible torque transmitting universal joint disk formed with a lateral clamp seat thickened to receive the lateral gripping pressure of correlatively shaped clamping means, and to engage and be confined as against squeezing out by such pressure, within the outer gripping edges of such clamping means.

6. A flexible torque transmitting universal joint disk locally thickened, as compared with the rest of the disk, to receive the lateral grip of connective clamping means.

7. A flexible torque transmitting universal joint disk molded with compressible laterally protuberant gripping seats for receiving the lateral pressure of clamping devices.

8. A torque transmitting flexible disk having protuberant compressible rounded clamp seats on each face, the seats on one face being directly opposite those on the other respectively, the rounded surfaces of said seats intersecting the surfaces of said disk, respectively.

9. As an article of manufacture, a flexible torque transmitting universal joint disk preformed with a series of lateral projections alternating between its sides, for slip-resisting engagement in connective means.

10. A flexible torque transmitting universal joint disk molded with a narrow clamping portion transverse to the lines of torque stress and of configuration to be confined and compressed circumferentially of the disk within the outer gripping edges of correlatively shaped clamping means.

11. A flexible torque transmitting universal joint disk locally thickened into narrow radially extending, slip-resisting clamp seats, for receiving the lateral pressure of clamping devices.

12. A flexible torque transmitting universal joint disk preformed with elongated laterally projecting clamp seats extending across the lines of torque stress in the disk, for receiving the lateral grip of clamp devices.

13. A flexible torque transmitting universal joint disk molded with permanent clamp engaging portions bodily deflected and projecting outside the planes of its faces.

14. As an article of manufacture, a flexible torque transmitting universal joint disk preformed with a series of lateral projections and corresponding opposed lateral depressions, for slip-resisting cooperation with connective means.

15. As an article of manufacture, a flexible torque transmitting universal joint disk preformed with portions bodily offset from the general plane of the disk, oppositely in alternation around it, for slip-resisting co-operation with connective devices.

16. A flexible torque transmitting universal joint disk molded with a concave-convex wall portion for cooperation with correspondingly shaped connective means, so as to resist slippage relative to such means by virtue of its resistance to deformation from its aforesaid preformed configuration.

17. A flexible torque transmitting universal joint disk preformed with radially extending lateral ridges and corresponding opposed lateral furrows.

18. A flexible torque transmitting universal joint disk preformed with a laterally offset portion for engaging in the gripping elements of a connecting device and receiving their lateral pressure, and thicker between than at the edges of said portion.

19. A flexible disk for torque transmitting universal joints comprising a vulcanizable material and a strengthening material vulcanized together, and preformed with a compressible portion projecting from the disk face to receive the lateral grip of a clamp device.

20. A flexible disk for torque transmitting universal joints comprising a vulcanizable material and a strengthening material vulcanized together, preformed with an offset portion for receiving the grip of a clamping device, and thicker between than at the edges of said portion.

21. A flexible disk for torque transmitting universal joints comprising a vulcanizable material and a strengthening material vulcanized together, and formed with a portion thicker than the body of the disk for receiving the lateral grip of a clamping device.

22. As an article of manufacture, a flexible torque transmitting universal joint disk comprising stress transmitting fibers held together by frictioning material, and locally deflected with reference to the lines of stress in the disk to afford more efficient means of stress transmitting connection to the latter.

23. As an article of manufacture, a flexible torque transmitting universal joint disk comprising stress transmitting fibers held together by frictioning material, and locally displaced sidewise with reference to the general plane of the disk to afford more efficient means of stress transmitting connection to the latter.

24. A flexible torque transmitting universal joint disk comprising stress transmitting fibers held together by frictioning material, and locally deflected outside the space defined by the planes of the disk sides to augment its resistance to slippage.

25. As an article of manufacture, a flexible torque transmitting universal joint disk comprising fabric layers generally approximately coincident with surfaces defined by the lines of torque stress in the disk, but locally displaced from such coincidence to afford more effective means of stress transmitting connection to the disk.

26. A flexible torque transmitting universal joint disk formed and constructed of a series of stress transmitting fabric layers held by frictioning material with local lateral displacements of the fabric to afford more effective means of stress transmitting connection to the disk.

27. A flexible torque transmitting laminated fabric universal joint disk constructed with lateral slip-resisting projections reinforced and strengthened by local lateral displacement of the fabric.

28. As an article of manufacture, a compressible flexible torque transmitting universal joint disk comprising inter-adherent fabric layers locally deflected to afford effective slip-resisting convex lateral gripping seats.

29. A flexible torque transmitting laminated fabric universal joint disk locally thickened by lateral distortion of laminæ.

30. A flexible torque transmitting laminated fabric universal joint disk constructed with portions of its laminated body raised outside the space defined by the planes of its sides over elongated areas extending transversely of the lines of torque stress.

31. A flexible torque transmitting laminated fabric universal joint disk constructed with fabric layers laterally deflected outside of the space defined by the planes of its faces in the form of radially extending ridges or ribs.

32. A flexible torque transmitting universal joint disk formed with a clamping portion of slip-resisting conformation, and provided with relatively rigid internal reinforcement for such portion.

33. A flexible torque transmitting universal joint disk with a portion of externally slip-resisting cross section for engagement in a connecting device and reinforcing means for maintaining such cross section embedded in the thickness of the disk.

34. A flexible torque transmitting universal joint disk laterally deformed for co-operation with connective means, with reinforcing means for maintaining the shape of the deformation embedded in the disk.

35. A flexible torque transmitting universal joint disk superficially deformed for cooperation with connective means, with a metal member of corresponding form embedded in the disk opposite such deformation.

36. A flexible torque transmitting universal joint disk having a thickened clamping portion with relatively rigid reinforcement embedded in its thickness.

37. A torque transmitting flexible disk having protuberant compressible clamp seats on its face and relatively hard backing embedded in the disk opposite said seats.

38. A flexible compressible disk adapted to transmit torque, said disk including, in combination, a plurality of convex gripping faces at circumferentially spaced points of said disk, and backing pieces embedded in said disk opposite said convex faces, respectively.

39. A flexible disk for torque transmitting universal joints comprising a vulcanizable material and a strengthening material vulcanized together, and having an offset portion, formed by a member embedded in the thickness of the disk, projecting from the disk face for engagement with the gripping element of a connecting device.

40. A flexible disk for torque transmitting universal joints comprising a vulcanizable material and a strengthening material vulcanized together, and formed with opposed offset portions projecting from its faces for engagement with the gripping element of a connecting device and maintained by means embedded in the thickness of the disk.

41. A flexible disk for torque transmitting universal joints comprising a vulcanizable material and a strengthening material vulcanized together; formed with a portion for engagement in the gripping elements of a connecting device thicker between than at its edges and so maintained by means embedded in the thickness of the disk, said portion extending radially substantially across the width of the disk.

42. A substantially flat flexible disk for torque transmitting universal joints comprising a vulcanizable material and a suitable reinforcing or strengthening material, such as cord or fabric, vulcanized together and molded with an offset portion on a face to coact with the gripping element of a connecting device, such offset portion being formed by embedding a plug in the disk.

43. A flexible torque transmitting universal joint disk comprising stress transmitting fibers held together by frictioning material, with reinforcing means interposed amongst and deflecting said fibers to afford more efficient means of stress-transmitting connection to the disk.

44. A flexible disk for taking rotative torque consisting of a series of connected stress-transmitting fabric layers and a body of material imbedded in and enclosed by certain of said layers so as to deflect the same outside of and beyond the normal plane of the disk.

45. A flexible torque transmitting universal joint disk comprising fabric formed into ridges transverse to the line of torque, for cooperating with connective means, with rigid members of corresponding form reinforcing said ridges.

46. A flexible torque transmitting rubberized laminated fabric universal joint disk moulded with backing pieces between laminæ deflecting them sidewise to afford slip-resisting lateral clamping seats.

47. A compressible flexible torque transmitting universal joint disk including fabric layers adhering together and encompassing doubly convex backing pieces located at circumferentially spaced gripping points.

In testimony whereof, I have hereunto signed my name.

HARRY P. MACDONALD.